United States Patent [19]

Wheeler et al.

[11] 4,163,154

[45] Jul. 31, 1979

[54] NEUTRON PERSONNEL DOSIMETER

[75] Inventors: Robert V. Wheeler, Lemont; Richard A. Oswald, Berwyn, both of Ill.

[73] Assignee: Technical Operations, Incorporated, Boston, Mass.

[21] Appl. No.: 817,696

[22] Filed: Jul. 21, 1977

[51] Int. Cl.² ................................................. G01T 1/04
[52] U.S. Cl. .................................... 250/473; 250/390; 250/472
[58] Field of Search ............... 250/472, 473, 390, 391, 250/392

[56] References Cited

U.S. PATENT DOCUMENTS

| | | | |
|---|---|---|---|
| 3,735,135 | 5/1973 | Bredoux et al. | 250/472 |
| 3,855,477 | 12/1974 | Fleischer | 250/472 X |

Primary Examiner—Davis L. Willis
Attorney, Agent, or Firm—Alfred H. Rosen

[57] ABSTRACT

A personnel neutron dosimeter consisting of a single recorder and a (n, α) radiator wherein exposure to two levels of neutron energy produces differing plural forms of damage sites in the recorder, which damage sites, upon development, will differ sufficiently in character or as to location on the recorder to permit separate identification and measurement of the neutron dose received from two portions of the neutron spectrum.

7 Claims, 4 Drawing Figures

NEUTRON PERSONNEL DOSIMETER

BACKGROUND OF THE INVENTION

This invention relates to personnel neutron radiation dosimetry.

The problem of personnel neutron dosimetry is complex, and no presently available single dosimeter is sensitive uniformly to the many orders of magnitude of neutron energy to which personnel may be subjected. The only existing approach to this problem is to use two dosimeters which have their respective sensitivities in separate parts of the neutron spectrum. As a specific example, it is known to use a dosimeter such as the polycarbonate "track-etch" dosimeter which is sensitive to the range which is greater than 1 MeV, together with an albedo type dosimeter which is most sensitive in the very low energy range of neutrons. In the former, damage sites or tracks are produced from fission or nonfission reactions occurring adjacent to or within a polycarbonate foil and are etched by using a caustic solution. A method of developing the damage sites or tracks according to the electrochemical process of Tommasino Italian Pat. No. 929,339 is useful. When data from both dosimeters are analyzed an estimate of the spectrum shape can be made, and as a result an estimate of the exposure can be derived.

GENERAL NATURE OF THE INVENTION

It is an object of this invention to provide a personnel neutron dosimeter consisting of a single recorder (e.g.: polycarbonate film) and an (n,α) radiator. Damage sites result from (n,α) reactions in the radiator and carbon/oxygen recoil reactions within the polycarbonate itself. Exposure to two levels of neutron energy, e.g. fast neutrons and slow neutrons, produces differing plural forms of damage sites in the recorder, which damage sites, upon development, will differ sufficiently in character (or differ as to location on the recorder) to permit separate identification and measurement of the neutron dose received from two portions of the neutron spectrum.

It is also an object of this invention to provide a method of neutron dosimetry which comprises the steps of exposing a dielectric track recorder to the products of (n,α) and carbon and oxygen recoil reactions so as to cause the formation in the track recorder of damage sites due to the resulting alpha particles and recoiling carbon atoms and oxygen atoms, developing those damage sites in a way to distinguish the alpha-caused sites from the carbon/oxygen-caused sites, and from the so-developed damage sites determining the frequency of occurrence of each reaction.

In practicing the invention, according to one embodiment, a foil of polycarbonate may be used in close contact with an alpha-emitting radiator for producing in the foil alpha damage sites from (n,α) reactions and carbon and oxygen recoil reactions within the polycarbonate foil resulting in a second set of identifiable damage sites. Lithium tetraborate has been found to be an excellent source of alpha particles; it is also sensitive to the low energy portion of a neutron spectrum. However, other substances can also be used, and the alpha-emitting radiator can also be introduced as an impurity in the polycarbonate foil which will avoid the use of an external alpha radiator. Alternatively, a different kind of dielectric track recorder may be coated with an alpha-emitting radiator to provide the combined dosimeter structure. Many combinations can be visualized; the option selected will depend on the specific dosimeter application.

Following exposure of the dosimeter to a neutron spectrum, the dielectric foil is electrochemically etched according to the Tommasino process, for example, using a caustic solution on one or both sides of the foil with a high voltage applied to both solutions where the foil now becomes the insulator. An oscillating frequency is then applied to the high voltage which results in enlarging the damage sites from both types of radiation particles. Using this process, it has been discovered that the respective diameters of the etched damage sites of the two reactors (n,α) and carbon/oxygen recoils differ by a factor of approximately four. Specifically, the diameter of sites produced from damage from heavy particle emissions or recoils are approximately four times greater than damage sites produced by alpha particles. As a result of this fact, the frequency of occurrence of both reactions (e.g.: reactions due to slow or thermal neutrons and fast neutrons) can be objectively determined in a single dosimeter structure and two points of the neutron spectrum can be quantitatively identified. By using these data, the quality of the neutron spectrum can be estimated and a dose assigned which better represents the overall neutron distribution.

While it is not claimed to be new to cause damage on different or separate dielectric foils from different reactions, it has not been possible heretofore to process simultaneously and to distinguish the resulting etch pits from carbon/oxygen recoils and alpha particles on the same foil.

DETAILED DESCRIPTION OF THE DRAWINGS

Figure 1:
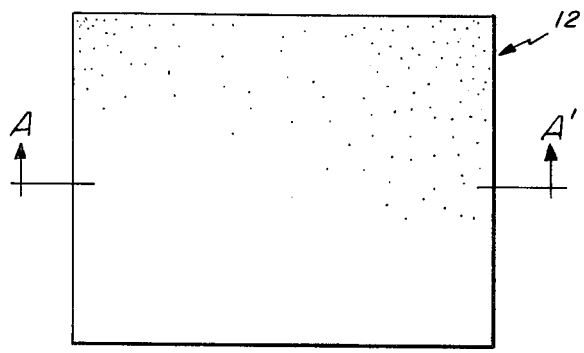
FIG. 1 shows the plan outline of recorder of a dosimeter.
Figure 2:
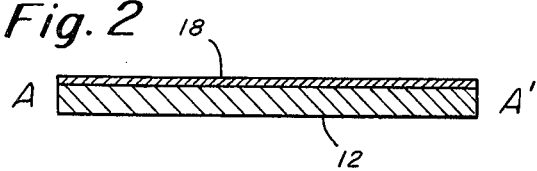
FIG. 2 is a section on line A—A of FIG. 1.
Figure 3:
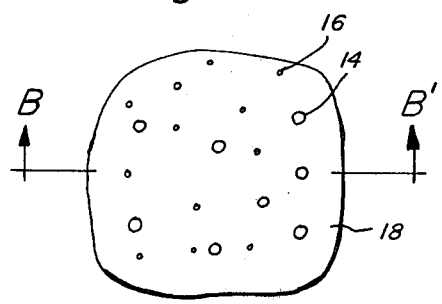
FIG. 3 is an enlarged section of FIG. 1, showing two sets of developed damage sites, distinguishable one from the other by relative size, and by location on or in the recorder.
Figure 4:
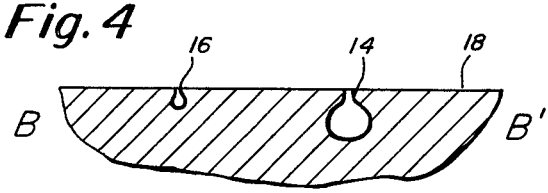
FIG. 4 is a partial section on line B—B of FIG. 3, showing one damage site of each set, to illustrate the difference in size.

The drawing shows a pictorial representation of a dielectric track detector as it would appear greatly magnified (FIG. 3) after exposure to (n,α) and carbon/oxygen recoil reactions and development as described above. The foil 12 has a damage site 14 caused by carbon/oxygen recoil reaction and a damage site 16 caused by an (n,α) reactions (FIG. 4). The coating 18 (FIG. 2) presents a radiator that may be coated on a surface of the recorder or placed in close contact to the recorder. As is indicated above, radiators may be applied to a surface of the track detector 12 or incorporated in the structure of the track detector.

With a dosimeter exposed and developed as herein described, the damage sites 14, 16 representing different regions of a neutron spectrum can be separately studied quantitatively using existing counting and analysis techniques.

We claim:

1. A method of neutron dosimetry which comprises the steps of exposing a dielectric track recorder to the products of (n,α) and carbon and oxygen recoil reactions so as to cause the formation in the track recorder of damage sites due to the resulting alpha particles and recoiling carbon atoms and oxygen atoms, developing those damage sites simultaneously in a way to distinguish the alpha-caused sites from the carbon/oxygen-caused sites, and from the so-developed damage sites determining the frequency of occurrence of each reaction.

2. A method according to claim 1 wherein following exposure of the dosimeter to a neutron spectrum, the recorder is electrochemically etched, using a caustic solution on one or both sides of the recorder with a high voltage applied to both solutions where the recorder is an insulator, and an oscillating frequency is applied to the high voltage so as to enlarge the damage sites from both types of radiation particles, whereby the respective diameters of the etched damage sites of the two reactors (n,α) and carbon/oxygen recoils differ by a factor of approximately four.

3. A personnel neutron dosimeter, comprising a foil of dielectric material in association with an alpha-emitting radiator for producing in the foil alpha damage sites from (n,α) reactions and carbon and oxygen recoil reactions within the dielectric foil, so as to produce in the foil a first set and a second set of independently identifiable damage sites, whereby upon exposure of said dosimeter to a spectrum of fast neutrons and slow neutrons said first and second sets of damage sites will be produced in said foil.

4. A dosimeter according to claim 3 wherein upon development the damage sites of one set produced from the heavier particles are approximately 4 times larger than the damage sites from the other set.

5. A dosimeter according to claim 3 wherein the damage sites of each set are dispersed over said foil so that the frequency of the damage sites of each set can be determined independent of the frequency of the damage sites of the other set.

6. A developed personnel neutron dosimeter comprising a dielectric material having developed damage sites produced respectively by the products of (n,α), and carbon and oxygen recoil reactions, the developed damage sites produced by the heavier particles from carbon and oxygen recoil reactions being approximately 4 times larger than the developed damage sites produced by the lighter particles from alpha reactions.

7. A developed dosimeter according to claim 6 wherein the larger damage sites and the smaller damage sites are dispersed on the recorder, so that the frequency of each can be separately determined.

* * * * *